Patented July 17, 1934

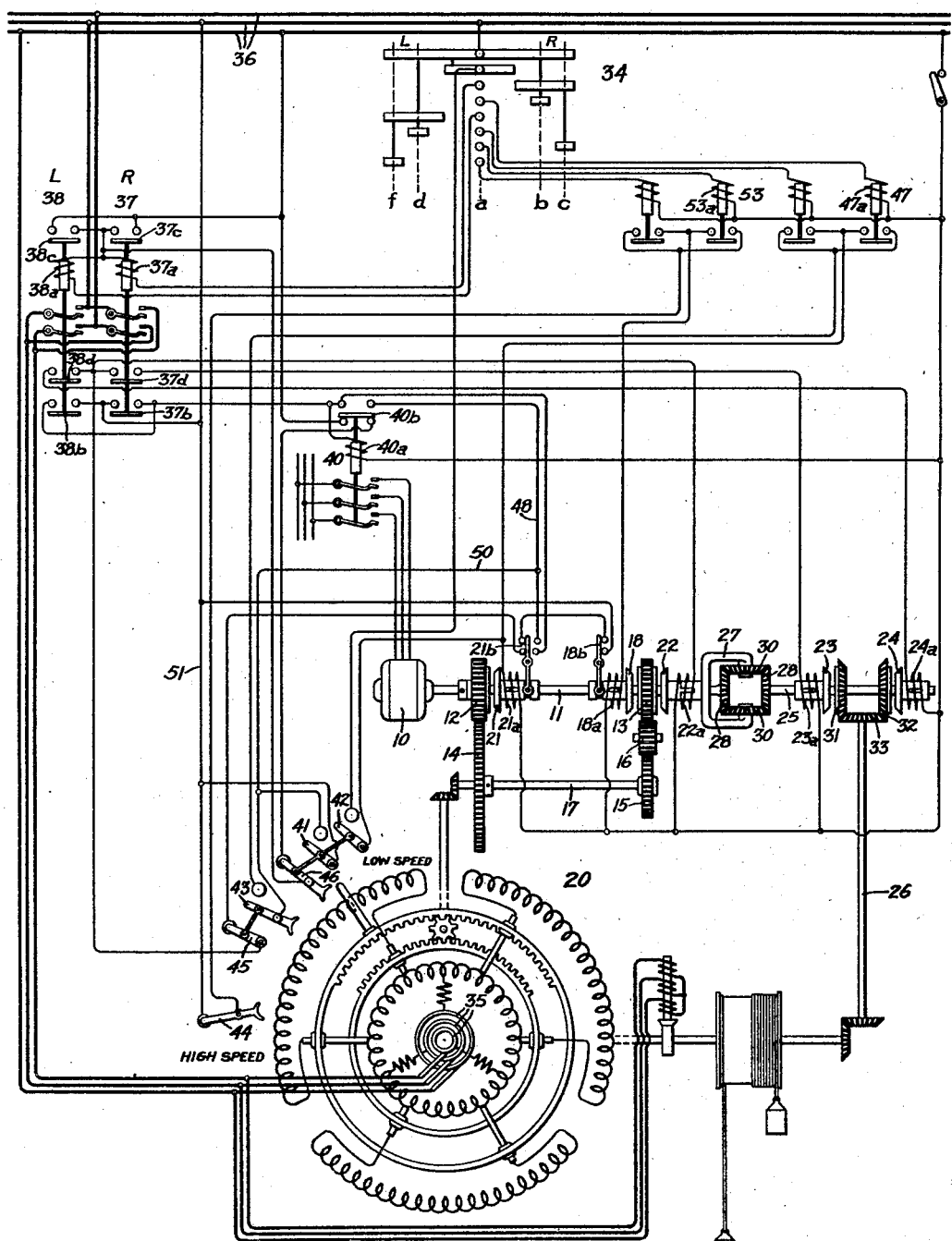

1,967,090

UNITED STATES PATENT OFFICE 1,967,090

ELECTRIC MOTOR CONTROL

Harold F. Jefferson, Rugby, and Ralph D. Given, Leamington, England, assignors to General Electric Company, a corporation of New York Application June 5, 1933, Serial No. 674,416
In Great Britain June 6, 1932

5 Claims. (Cl. 172—179)

This invention relates to electric motor control, more particularly to the speed control of alternating current three phase or single phase commutator motors though not limited to these types of motor as it is also applicable to direct current motors having shunt field regulators or forming part of a Ward-Leonard system.

The object of the invention is to provide means for controlling the acceleration, retardation and speed of a motor and to provide means for running the motor at a definite constant reduced speed where normally variations in the load would produce variations in the speed, as for example when the brushes of a three phase commutator motor are moved to a position to give reduced speed.

A control system of this type is particularly useful in the case of lifts or hoists, where it is necessary to accelerate and decelerate the motor as quickly as possible, and, before the floor level is reached, to reduce the speed to a low value to enable the hoist or lift to be accurately leveled.

With motors of the commutator type, there is a comparatively large difference in the number of revolutions per minute between no load and full load when the brushes are at a reduced speed position.

The distance moved by the car of a lift or hoist after the motor is shut down and the brake applied, depends upon the kinetic energy of the moving system. The greater the kinetic energy the greater will be the distance moved by the car in coming to rest when the force applied by the brake is the same. The kinetic energy is due to the speed of the moving parts and to their inertia. The latter will vary with the load in the car and will therefore cause a variation in the kinetic energy of the system.

The speed of the motor will also vary with the load in the car and cause a further variation in the kinetic energy of the system, thus there will be a considerable variation in the distance moved by the car in bringing it to rest. If, however, it is possible to insure a constant fixed speed at the moment of shutting down the motor and applying the brake, this variation in the distance moved in bringing the car to rest will be considerably reduced and hence accurate leveling will be facilitated.

One of the principal objects of this invention is to attain this constant fixed speed.

In the case of a lift or hoist it is possible to retard the car at a more rapid rate than that at which it can be accelerated and it is a further object of the invention to provide means for giving different rates of acceleration and deceleration.

According to the present invention, we provide a pilot shaft driven at constant speed and means for coupling this shaft to a speed changing device to accelerate and retard the main driving motor as desired. The rate of acceleration and retardation are each determined by gearing interposed between the pilot shaft and the speed change device. In order to obtain a desired constant speed, a second shaft driven by the main motor is employed. At the desired motor speed the two shafts rotate at the same speed, and means are provided for altering the speed changing device to correct the motor speed when the speeds of the shafts differ.

For a better and more complete understanding of the invention, reference should now be had to the following specification and to the accompanying drawing, the single figure of which is a diagrammatic view of an arrangement according to the invention for obtaining rapid acceleration and rapid deceleration of the motor and also to achieve a constant fixed low speed when the brake is applied. Safety and other devices are omitted for the sake of simplicity.

Referring now to the drawing, a pilot motor 10, or other source of constant speed, runs continuously in the same direction during the operation of the lift or hoist. This motor is connected to a shaft 11, which carries, loosely mounted thereon, the gear wheels 12 and 13, which are in permanent engagement with the gears 14 and 15 (13 through the idler 16) respectively. The gears 14 and 15 are attached to the shaft 17 which operates the main motor brush gear.

To accelerate the main motor 20, a clutch 18 is caused to engage the gear wheel 13. The pilot motor 10 will therefore drive the shaft 17 to move the brushes of the main driving motor 20 to their high speed position. When this is reached the clutch 18 is disengaged.

To reduce the speed of the motor when approaching a landing point the clutch 21 is caused to engage the gear wheel 12. The pilot motor will therefore drive the shaft 17 in the opposite direction (owing to the fact that the idler 16 is interposed in the previous gear train) and move the brushes back towards their low speed position.

By the suitable choice of the above gear wheels both the maximum satisfactory rate of acceleration and of deceleration of the motor can be attained.

When the brushes reach the range in which they must be moved to give the fixed constant speed under the various loading conditions that will be encountered, the clutch 21 is disengaged and a clutch 22 is engaged together with one or other of the clutches 23 or 24, so that shaft 25 is driven by the main motor through shaft 26, and the choice of engaging either clutch 23 or 24 is made so that the shaft 25 rotates in the opposite direction to the shaft 11. This choice is thus determined by the direction in which the main motor 20 is rotating.

Gearing between the main motor and the shaft 25 is so chosen that if the main motor is running at the correct speed, the shaft 25 will be running at the same speed as the shaft 11, but in the opposite sense. Under these conditions the third element 27 of a differential formed by the gears 28 and 30 will remain stationary in space, but if the speed of the main motor is not correct, then the third element 27 will be rotated by the differential action of the gears 28 and 30 so that the shaft 17 is caused to rotate to bring the brushes to a lower speed position if the main motor speed is too high or to bring the brushes to a higher speed position if the main motor speed is too low. Only when the main motor speed has been brought to the correct value will the third element be stationary.

It will be obvious that the shaft 25 must always rotate in the same direction, though the main motor 20 is required to rotate in both directions. The gears 31, 32 and 33 and the clutches 23 and 24 are therefore provided, clutch 23 or clutch 24 being brought into engagement according to whether the main motor is running in the forward or reverse direction.

Other forms of gearing than those shown may obviously be used. For example, the differential may make use of spur wheels instead of bevel wheels as shown.

The clutches may be of any convenient form and will preferably be electrically operated.

The starting and stopping of the system is under the control of a suitable manually operated multi-speed reversing controller master switch shown conventionally as a drum type switch 34.

Coils 21a, 18a, 23a, 24a and 22a represent the operating windings for the corresponding clutches indicated in the drawing. The slip rings 35 of the main driving motor 20 are connected to the supply lines 36 through "raise" contactor 37 and "lower" contactor 38 connected in parallel. Contactors 37 and 38 have operating coils 37a and 38a and interlock contacts 37b, 37c, 37d and 38b, 38c and 38d, respectively. Pilot motor 10 is adapted to be energized from the supply by pilot motor contactor 40 which has an operating coil 40a and interlock contacts 40b. Limit switches 41, 42, 43, 44, 45 and 46 are operated according to the position of the brushes upon the main driven motor. Limit switches 41 and 42 are open and switch 46 is closed only in the low speed brush position. Switch 43 is closed, and switch 45 is open only above the low-speed brush-range position and 44 is open only in the highest speed brush position. The car controller 34 has an "off" position $a$, "raise slow" position $b$, "raise fast" position $c$, "lower slow" position $d$ and "lower fast" position $f$.

The operation is as follows: When the controller 34 is moved to the "raise slow" point $b$, the circuit through coil 37a of the raise contactor 37 is completed and the main motor will start rotating to raise the car. Pilot contactor coil 47a is energized and contactor 47 also closes but cannot complete the circuit of coil 21a since limit switch 43 is open.

The coil 40a of pilot motor contactor 40 is energized by interlock 37b of contactor 37, and the pilot motor 10 runs up to speed.

The circuit through coil 22a is completed, switches 18b and 21b being closed when clutches 18 and 21 are disengaged and on the closing of the interlock 37d, clutch operating coil 23a is energized. Clutches 23 and 22 are thus engaged, and gears 28 rotate in opposite directions and the arrangement is thus set to maintain the main motor at the constant fixed low speed, irrespectively of the loading of the car.

On return the car controller 34 to the "off" position $a$, the contactor 37 will open and the main motor will be shut down bringing the car to rest. Since the brushes are not in the bottom speed position the limit switches 41 and 42 will be closed so that contactor 40 remains closed and pilot motor continues to run. The holding circuit for contactor 40 is traced through the interlock 40b in the upper closed position, conductors 48, 50, limit switch 41 and conductor 51 to the middle supply line 36. A circuit is completed through limit switch 42 and windings 21a. The clutch 21 is energized and the circuit through 22a is broken at 21b as the latter is operated to its right-hand position when the clutch 21 is engaged. Since raise contactor 37 is open, interlock 37d is also open and the circuit through 23a is broken so that the mechanical gear is set to run the brushes back to the bottom speed position. On reaching this position the limit switch 42 opens, breaking the circuits of coils 21a and 40a as interlock 21b is operated to its left-hand position, so that all the clutches are deenergized and the pilot motor is shut down. Until the brushes reach the bottom speed position the limit switch 46 is open so that the motor cannot be restarted till the brushes are in this position.

If the car controller is moved to the "raise fast" position $c$ after momentarily operating on "raise slow" position $b$, conditions are such that as the switch 34 passes through position $b$, circuits are completed to close contactor 37 and energize coil 53a. Contactor 53 closes, completing the circuit of clutch operating coil 18a, so that, since the circuit of coil 40a is completed and the pilot motor running, the mechanical gear is set to run the brushes up to the high speed position and when this position is reached the opening of limit switch 44 breaks the circuit of 18a, so that the main motor runs at its top speed.

On bringing the car controller back to the "raise slow" position $b$, coil 53a is deenergized so that even if the brushes have not had time to reach the top speed position the circuit of clutch operating coil 18a is broken. A circuit is completed through coil 47a and switch 47 closes to complete the circuit of clutch operating coil 21 and so sets the mechanical gear to run the brushes back towards the low speed position.

When the brushes reach the range in which they are to be controlled to give the fixed constant speed, the limit switch 43 breaks the circuit of coil 21a and the limit switch 45 closes to complete circuits through clutch operating coils 23a and 24a so that the mechanical gear is set for maintaining the fixed constant speed.

The action on returning to the "off" position of the car controller is similar to that previously described.

It will be obvious that the control circuits may be fed from some separate source, either alternating current or direct current, and need not be fed from the main supply as is shown in the diagrams.

What we claim as new and desire to secure by Letters Patent of the United States is:

1. Control means for the speed of an electric motor comprising a speed changing device for said motor, a pilot shaft, means for continuously rotating said shaft at substantially constant speed during the operation of said motor, means for connecting said shaft to said speed changing device to effect operation of said device at a predetermined speed in a direction to increase the motor speed and at another predetermined speed in a direction to decrease the motor speed whereby the motor may be accelerated and retarded at desired different rates.

2. A system for controlling the speed of an electric motor having movable brushes and brush shifting gear for varying the speed of the motor comprising a pilot shaft, means for continuously rotating said shaft at substantially constant speed during operation of said motor, means for connecting said shaft to said brush shifting gear to operate said brush shifting gear at predetermined speeds in directions to increase and decrease the motor speed whereby the motor may be accelerated and retarded at desired rates.

3. A system for controlling the speed of an electric motor as claimed in claim 2 in which means are provided for obtaining also a desired constant speed comprising a second shaft, means for rotating said second shaft at a speed in fixed ratio to the motor speed and means for rotating the motor brush gear when the speed of the second shaft is not in agreement with that of the pilot shaft in such a direction that the speed of the second shaft approaches agreement with that of the pilot shaft.

4. Control arrangement for the speed of an electric brush shifting type motor comprising a constant speed pilot motor, an electromagnetic clutch and fixed ratio gearing for coupling the pilot motor to brush shifting mechanism in a manner to accelerate the main motor, an electromagnetic clutch and fixed ratio gearing for coupling the pilot motor to the brush shifting mechanism in a manner to retard the main motor, and for obtaining a desired constant main motor speed, a differential gear device coupled by means of an electromagnetic clutch to the brush shifting mechanism and adapted to correct the main motor speed when the clutch is energized and when the speed of the main motor differs from a desired ratio with the speed of the pilot motor.

5. In a control system, an electric main motor provided with movable brushes and brush shifting device for varying the speed thereof, a constant speed pilot motor, an electromagnetic clutch for coupling said pilot motor to said brush shifting device to accelerate said main motor, a second electromagnetic clutch for coupling said pilot motor to said brush shifting device to retard said main motor, means providing a desired constant speed for said main motor comprising a differential gear device and an electromagnetic clutch for coupling said differential device to said brush shifting device and adapted to correct the main motor speed when said last-mentioned clutch is energized and the speed of said main motor differs from a desired ratio with respect to the speed of said pilot motor, and a master switching device for controlling the operation of said clutches.

HAROLD F. JEFFERSON.
RALPH D. GIVEN.